C. B. JONES.
FLOOD GATE.
APPLICATION FILED OCT. 7, 1912.
1,066,909.
Patented July 8, 1913.
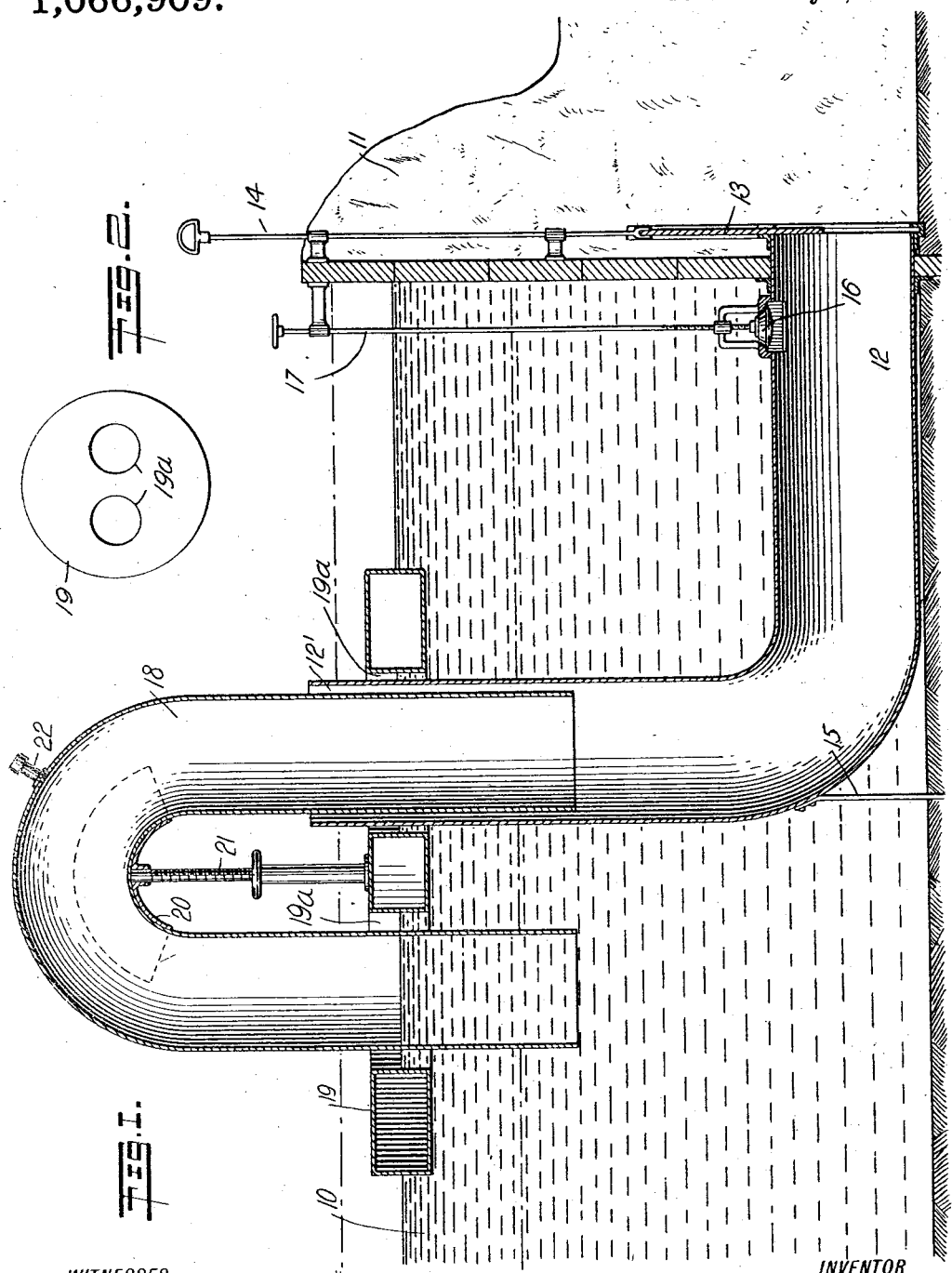
WITNESSES
G. Robert Thomas
Geo. H. Beeler
INVENTOR
Carl B. Jones,
BY Munn & Co
ATTORNEYS

UNITED STATES PATENT OFFICE.

CARL BRUCE JONES, OF NEZPIQUE, LOUISIANA.

FLOOD-GATE.

1,066,909.  Specification of Letters Patent.  Patented July 8, 1913.

Application filed October 7, 1912. Serial No. 724,341.

*To all whom it may concern:*

Be it known that I, CARL B. JONES, a citizen of the United States, and a resident of Nezpique, in the parish of Acadia and State of Louisiana, have invented a new and Improved Flood-Gate, of which the following is a full, clear, and exact description.

This invention relates to water distribution and has particular reference to a means for securing a constant or regular delivery or flow of water from a reservoir or source of supply, the depth of which is variable.

More particularly, this invention consists of a means for delivering definite or regular quantities of water from a main canal for use by parties tributary to such canal for irrigation purposes.

It is a well known fact that under ordinary mechanical conditions it is impossible to serve water satisfactorily to a large number of customers from an irrigation canal due to the fact that the conditions of the water, local or otherwise, produce variations of level in such main canal. By the means herein illustrated it is possible and practical for all of the customers along such a canal to be served fairly and satisfactorily, within the capacity of the canal, the delivery to each customer being the same as for every other customer and regardless of the water head. Furthermore, the means herein shown is of a compact, strong, reliable and comparatively cheap nature.

The foregoing and other objects of this invention will hereinafter be more fully described and claimed and illustrated in the drawings accompanying this specification in which like characters of reference indicate corresponding parts in both the views, and in which—

Figure 1 is a vertical sectional view of the device; and Fig. 2 is a plan view of the float on a smaller scale.

Referring particularly to the drawings, I show at 10 a main body of water such as an irrigation canal, and at 11 is a dam or levee through or beyond which water is to be fed from the canal to a private party for irrigation of his land. The water in the canal being subject to different elevations, if the delivery was to be made through a sluice or gate under ordinary conditions, the force of the flow, and consequently the amount of water delivered would vary in accordance with the elevation or head of the water in the main canal. In order to overcome the several objections incident to the aforesaid variations in water delivery, I provide a conduit 12 of bent tubular form and including a vertical portion 12′ having its mouth extending above a maximum high water line and having its lower substantially horizontal portion projecting beyond the confines of the canal. Said lower end is provided with a slide or gate 13 adapted to be operated to either close or open the conduit by any suitable means such as a pull rod 14. The conduit pipe 12 may be secured in place by means of a brace 15 in connection with the dam or levee structure or by any other suitable means.

At 16 is a valve normally closing the lower portion of the conduit from the body of water in the canal but which, by operation of a screw 17, may be opened to admit water into the conduit for priming or preparing the construction for practical operation.

At 18 is shown a U-shaped siphon, the legs of which are of equal length and closely spaced, one of said legs being extended loosely into the upper end 12′ of the conduit.

A float 19 of any suitable capacity as to buoyancy and preferably of circular outline is arranged to float upon a body of water 10 and is provided with openings 19ª whereby the float at one of said openings surrounds the vertical part 12′ of the conduit, inclosing one of the siphon legs, and whereby the other siphon leg projects downwardly into the body of water beneath the float. The function of the float is to form a support for the siphon, whereby the ends thereof are maintained at a substantially fixed distance from the surface of the water irrespective of the water level. The manner of supporting the siphon from the float is shown as comprising a saddle 20 having an adjustable screw 21 extending upwardly from the center of the float. It is to be noted, therefore, that the construction thus far described is of a well balanced symmetrical nature and with no points of frictional contact or other devices which would be subjected to damage or interference on account of grass, weeds or other debris which may be floating in the water. At or near the upper end of the siphon is a nozzle 22 for the purpose of applying an air pump or other means for exhausting the air in the siphon as described below.

The operation of the device may be described briefly as follows: With the construction above described and arranged as illustrated, in order to start the operation, the gate 13 will be closed and the valve 16 will be opened, admitting water to fill the conduit and siphon up to the level of the surface of the water in the canal. An air pump or other means will then be applied to the nozzle 22 to exhaust the air from the upper portion of the siphon, the water from the canal entering the siphon to take the place of such air, after which the nozzle 22, of course, will be closed. The weight of the float and the adjustment of the screw 21 will be arranged in accordance with the water conditions or the weight to be sustained by the float. Upon opening the gate 13, the valve 16 being closed, the water will flow freely from the conduit 12 and the water from the canal will flow through the siphon into and through the conduit. The siphon being maintained at a constant elevation with respect to the surface of the water, the flow or discharge of water from the siphon will be in accordance with such constant elevation regardless of the elevation of the body of water 10 as a whole.

The several parts of the device may be made of any suitable materials and the precise form or design of the same may be varied to a considerable extent without departing from the spirit of the invention claimed.

Having thus described my invention, I claim as new and desire to secure by Letters Patent:—

1. In a flood gate for delivering water from a main body of water, the combination of a conduit submerged in such body of water and having one end projecting laterally therefrom and the other end projecting upwardly above high water level, means to control the passage of water from the lower end of the conduit, means to fill the conduit from the body of water, a siphon having one leg projecting loosely into the upper end of the conduit and the other leg projecting into the body of water, and means to support the siphon whereby it is maintained at a uniform elevation with respect to the surface of the water.

2. In an irrigation flood gate, the combination of a conduit having a vertically extending open end, a siphon having one leg projecting loosely into said upper conduit end and the other leg extending downward parallel thereto, and a float surrounding said conduit and both of said siphon legs and serving to maintain the siphon in operative position to deliver a uniform flow of water through the conduit.

3. In an irrigation flood gate, the combination of a tubular conduit having one end projecting upwardly, a siphon having one leg projecting loosely into said upper end of the conduit and movable vertically therein, a float arranged centrally with respect to said siphon and having spaced openings extending vertically therethrough, one of said openings surrounding said conduit and the other surrounding the other leg of the siphon, and means for adjustably supporting the siphon upon the float.

In testimony whereof I have signed my name to this specification in the presence of subscribing witnesses.

CARL BRUCE JONES.

Witnesses:
E. C. QUICK,
M. PARROTT,
E. DARPHIN.

Copies of this patent may be obtained for five cents each, by addressing the "Commissioner of Patents, Washington, D. C."